(12) United States Patent
Oba et al.

(10) Patent No.: US 11,584,168 B2
(45) Date of Patent: Feb. 21, 2023

(54) TIRE

(71) Applicant: SUMITOMO RUBBER INDUSTRIES, LTD., Hyogo (JP)

(72) Inventors: Ryo Oba, Hyogo (JP); Kenji Ueda, Hyogo (JP); Masatomo Nakamura, Hyogo (JP); Koji Hayashi, Hyogo (JP); Masaki Terashima, Hyogo (JP); Masahiro Nagase, Hyogo (JP); Masahiro Tatsuta, Hyogo (JP); Junya Tamai, Hyogo (JP); Masaya Ito, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 102 days.

(21) Appl. No.: 17/028,062

(22) Filed: Sep. 22, 2020

(65) Prior Publication Data
US 2021/0094361 A1 Apr. 1, 2021

(30) Foreign Application Priority Data

Sep. 30, 2019 (JP) .............................. JP2019-180275

(51) Int. Cl.
*B60C 13/02* (2006.01)
*B60C 13/00* (2006.01)
(Continued)

(52) U.S. Cl.
CPC ............ *B60C 13/02* (2013.01); *B60C 13/001* (2013.01); *B29D 2030/0612* (2013.01); *B29D 2030/726* (2013.01); *B60C 5/00* (2013.01)

(58) Field of Classification Search
CPC ............ B29D 2030/0612; B29D 30/72; B29D 2030/726; B60C 13/001
(Continued)

(56) References Cited

U.S. PATENT DOCUMENTS 5,645,660 A * 7/1997 Attinello ............... B60C 13/001
   D12/605
2006/0254689 A1* 11/2006 Wallet .................. B60C 13/001
   152/523
(Continued)

FOREIGN PATENT DOCUMENTS

EP  3306531 A1 * 4/2018 ............ B29D 30/72
FR  3049903  10/2017
(Continued)

OTHER PUBLICATIONS

ESpaceNet Translation of EP-3306531 (Year: 2022).*
(Continued)

*Primary Examiner* — Robert C Dye
*Assistant Examiner* — Alexander D Booth
(74) *Attorney, Agent, or Firm* — Greenblum & Bernstein, P.L.C.

(57) ABSTRACT

Provided is a tire provided with a mark capable of reducing the air resistance during tire rotation while maintaining good visibility. A tire is provided with a mark on a tire side portion. The mark includes a first mark located on an outer side in a tire radial direction, and a second mark located inward of the first mark in the tire radial direction. Each of the first mark and the second mark includes a recess that is recessed from a side profile surface of the tire side portion. A depth of the recess of the first mark from the side profile surface is smaller than a depth of the recess of the second mark from the side profile surface.

14 Claims, 7 Drawing Sheets

(51) Int. Cl.
  B29D 30/06 (2006.01)
  B29D 30/72 (2006.01)
  B60C 5/00 (2006.01)

(58) Field of Classification Search
  USPC .................................................. 152/523
  See application file for complete search history.

(56) References Cited

U.S. PATENT DOCUMENTS

| | | | | |
|---|---|---|---|---|
| 2008/0087362 | A1* | 4/2008 | Metz | B60C 13/001 |
| | | | | 152/523 |
| 2008/0283169 | A1* | 11/2008 | Sato | B60C 13/001 |
| | | | | 152/450 |
| 2013/0076108 | A1* | 3/2013 | Kubota | B60B 1/06 |
| | | | | 301/63.101 |
| 2013/0206305 | A1* | 8/2013 | Nakamura | B60C 13/001 |
| | | | | 152/523 |
| 2015/0290981 | A1 | 10/2015 | Berger et al. | |
| 2018/0099530 | A1* | 4/2018 | Yonetsu | B60C 13/001 |
| 2019/0202244 | A1* | 7/2019 | Okamatsu | B29D 30/72 |

FOREIGN PATENT DOCUMENTS

| | | | | |
|---|---|---|---|---|
| FR | 3079168 | | 9/2019 | |
| JP | 2007083604 | A * | 4/2007 | |
| JP | 2016-501149 | | 1/2016 | |
| WO | WO-2017191839 | A1 * | 11/2017 | B29C 59/02 |

OTHER PUBLICATIONS

ESpaceNet Translation of FR3079168 (Year: 2022).*
ESpaceNet Translation of JP2007083604 (Year: 2022).*
Extended European Search Report in EP Application No. 20196104 dated Dec. 9, 2020.

* cited by examiner

TIRE

BACKGROUND OF THE INVENTION

Field of the Invention

The present invention relates to a tire provided with a mark on a tire side portion.

Description of the Background Art

Conventionally, each tire side portion of a tire is provided with a mark including information such as the tire size and the manufacturing year/week. For example, Japanese Laid-Open Patent Publication (translation of PCT application) No. 2016-501149 proposes a tire having improved aerodynamic performance during rotation by including: a sector including a raised marking (mark); and a sector not including a raised marking.

However, the tire of Japanese Laid-Open Patent Publication (translation of PCT application) No. 2016-501149 has a problem that the air resistance caused due to the bulge of the mark is large, and the visibility of the mark is deteriorated if the size of the bulge is reduced in order to reduce the air resistance.

The present invention has been made in view of the above circumstances, and a main object of the present invention is to provide a tire provided with a mark capable of reducing the air resistance during tire rotation while maintaining good visibility.

SUMMARY OF THE INVENTION

The present invention is directed to a tire provided with a mark on a tire side portion, wherein the mark includes a first mark located on an outer side in a tire radial direction, and a second mark located inward of the first mark in the tire radial direction, each of the first mark and the second mark includes a recess that is recessed from a side profile surface of the tire side portion, and a depth of the recess of the first mark from the side profile surface is smaller than a depth of the recess of the second mark from the side profile surface.

In the tire according to the present invention, preferably, the mark includes a character string in which a plurality of characters is arranged, the characters are formed by the recesses, and the character string includes a first character string provided in the first mark, and a second character string provided in the second mark.

In the tire according to the present invention, a length in the tire radial direction of the first character string is preferably larger than a length in the tire radial direction of the second character string.

In the tire according to the present invention, an angle in a tire circumferential direction of the first character string is preferably larger than an angle in the tire circumferential direction of the second character string.

In the tire according to the present invention, a center in the tire circumferential direction of the first character string is preferably provided at a position different in the tire circumferential direction from that of a center in the tire circumferential direction of the second character string.

In the tire according to the present invention, preferably, a serration is provided in a first region where the first mark is located, and a smooth surface is provided in a second region where the second mark is located.

In the tire according to the present invention, preferably, the first mark is located outward of a tire maximum width position in the tire radial direction, and the second mark is located inward of the tire maximum width position in the tire radial direction.

The present invention is also directed to a tire provided with a mark on a tire side portion, wherein the mark includes a recess that is recessed from a side profile surface of the tire side portion, and, in the recess, a depth on an outer side in a tire radial direction from the side profile surface is smaller than a depth on an inner side in the tire radial direction from the side profile surface.

In the tire according to the present invention, the mark includes a first mark located on the outer side in the tire radial direction, and a second mark located inward of the first mark in the tire radial direction, and each of the first mark and the second mark includes a recess that is recessed from the side profile surface of the tire side portion. Such a mark does not protrude from the side profile surface and can reduce the air resistance during tire rotation.

In the tire according to the present invention, the depth of the recess of the first mark from the side profile surface is smaller than the depth of the recess of the second mark from the side profile surface. Such a first mark having a small depth can generate appropriate turbulent flow at a position on the outer side in the tire radial direction where the flow velocity of air is relatively high, to inhibit separation of a boundary layer, and can reduce the air resistance during tire rotation. In addition, even when the size of the mark is small, the second mark having a large depth has good visibility. Therefore, the tire according to the present invention can reduce the air resistance during tire rotation while maintaining good visibility of the mark.

In the tire according to the present invention, the mark includes a recess that is recessed from the side profile surface of the tire side portion. Such a mark does not protrude from the side profile surface and can reduce the air resistance during tire rotation.

In the tire according to the present invention, in the recess, the depth on the outer side in the tire radial direction from the side profile surface is smaller than the depth on the inner side in the tire radial direction from the side profile surface. Such a recess can generate appropriate turbulent flow on the outer side in the tire radial direction where the flow velocity of air is relatively high, to inhibit separation of a boundary layer, and can reduce the air resistance during tire rotation. In addition, the recess can make a difference in contrast in the tire radial direction, and can improve the visibility of the mark. Thus, the tire according to the present invention can reduce the air resistance during rotation while maintaining good visibility of the mark.

DESCRIPTION OF THE PREFERRED EMBODIMENTS

Hereinafter, an embodiment of the present invention will be described in detail with reference to the drawings.

Figure 1:
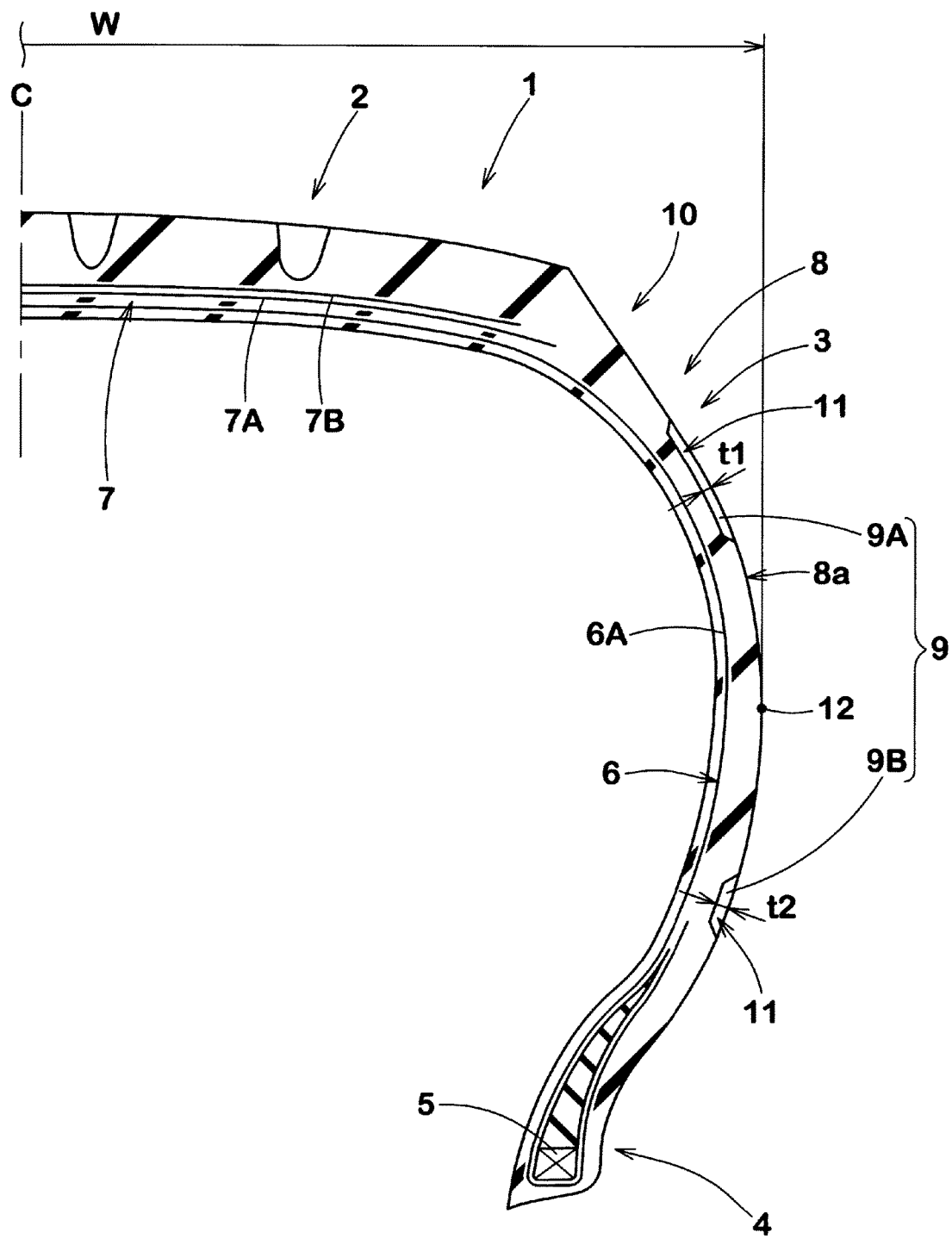
FIG. 1 is a cross-sectional view showing an embodiment of the tire according to the present invention.

FIG. 1 shows a cross-sectional view, of a tire 1 according to the present embodiment in a normal state, including a rotation axis. The tire 1 according to the present embodiment is suitably used as a rubber pneumatic tire which is mounted on a passenger car or the like. The tire 1 is not specified as a rubber pneumatic tire for a passenger car, and can be applied to various tires such as a heavy-duty pneumatic tire, a resin pneumatic tire, and a non-pneumatic tire the interior of which is not filled with pressurized air.

In the case where the tire 1 is a rubber pneumatic tire, the "normal state" is a state where: the tire 1 is mounted to a normal rim and adjusted to a normal internal pressure; and no load is applied to the tire 1. Hereinafter, unless otherwise specified, dimensions and the like of components of the tire 1 are values measured in the normal state.

The "normal rim" is a rim that is defined, in a standard system including a standard on which the tire 1 is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire 1 is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

As shown in FIG. 1, the tire 1 according to the present embodiment includes a toroidal carcass 6 extending from a tread portion 2 through sidewall portions 3 to bead cores 5 of bead portions 4; and a belt layer 7 disposed outward of the carcass 6 in the tire radial direction and within the tread portion 2. Here, the tire radial direction is a direction perpendicular to the tire rotation axis. In addition, the tire axial direction is a direction parallel to the tire rotation axis. Furthermore, the tire circumferential direction is a circumferential direction centered on the tire rotation axis, and is a direction perpendicular to the tire radial direction and the tire axial direction.

The carcass 6 includes at least one carcass ply. In the present embodiment, the carcass 6 includes one carcass ply 6A. The carcass ply 6A includes, for example, carcass cords (not shown) arranged at an angle of 75 to 90° relative to the tire circumferential direction. For example, organic fiber cords such as aromatic polyamide cords and rayon cords are suitable for use as the carcass cords. Such a carcass 6 serves to maintain the shape of the tire 1.

The belt layer 7 includes at least one belt ply. In the present embodiment, the belt layer 7 includes two belt plies 7A and 7B. Each of the belt plies 7A and 7B includes, for example, belt cords (not shown) arranged so as to be tilted at an angle of 15 to 45° relative to the tire circumferential direction. For example, steel, aramid, rayon, and the like are suitable for use for the belt cords. Such a belt layer 7 serves to enhance the stiffness of the tread portion 2 and improve the durability of the tire 1.

Figure 2:
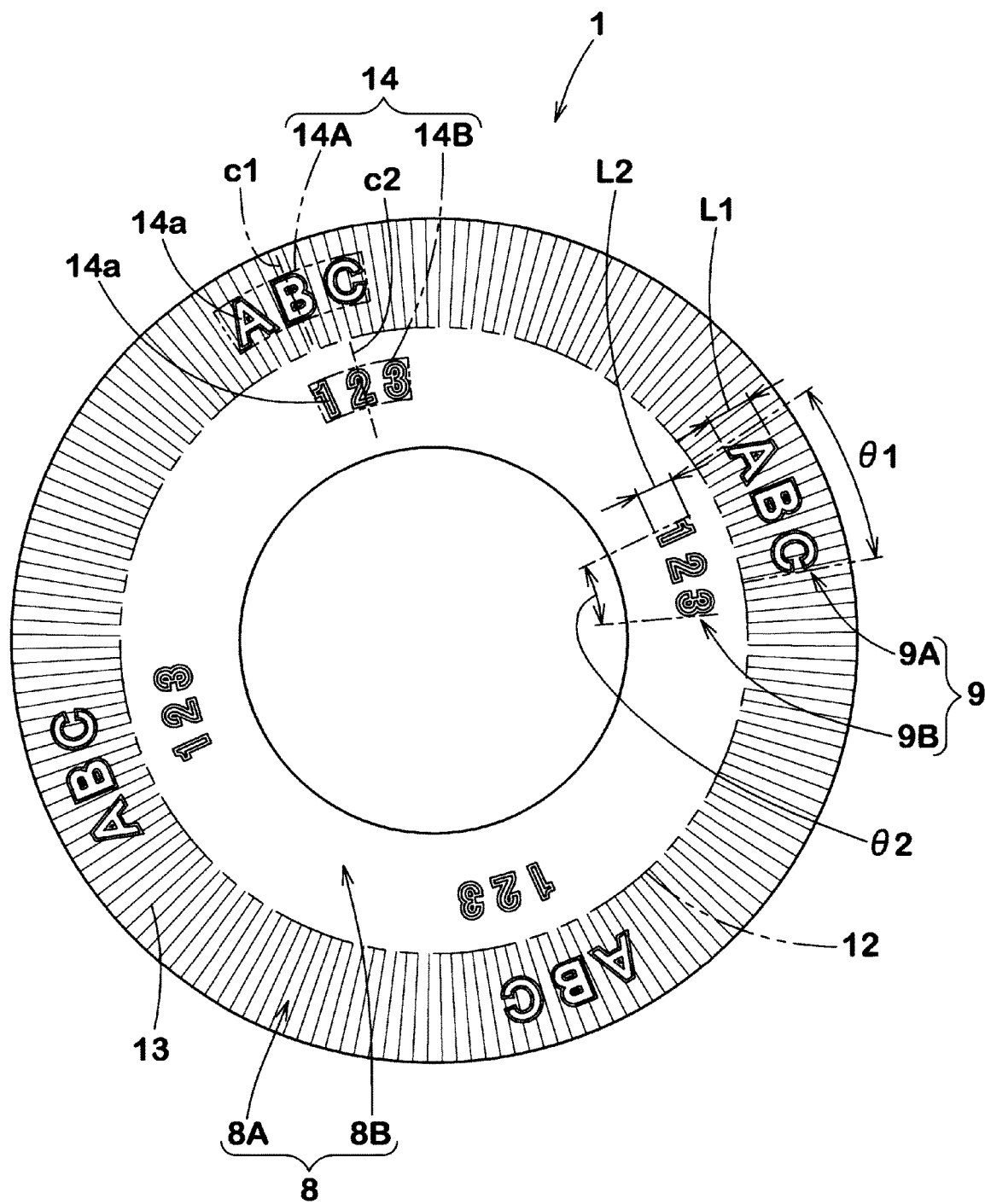
FIG. 2 is a side view of the tire in FIG. 1.

FIG. 2 is a side view of the tire 1. As shown in FIG. 1 and FIG. 2, the tire 1 according to the present embodiment is provided with a mark 9 on a tire side portion 8. The tire side portion 8 of the present embodiment includes the sidewall portion 3. The tire side portion 8 may include, for example, the bead portion 4 and a buttress portion 10. Here, the mark 9 includes characters, symbols, figures, patterns, and the like and is suitably used to display information such as the manufacturer name, brand name, tire size, and manufacturing year/week of the tire 1.

The mark 9 of the present embodiment includes a first mark 9A located on the outer side in the tire radial direction, and a second mark 9B located inward of the first mark 9A in the tire radial direction. In the present embodiment, a mode including the first mark 9A and the second mark 9B is exemplified as the mark 9, but the mark 9 is not limited to such a mode, and a plurality of marks 9 may be further included.

As shown in FIG. 1, each of the first mark 9A and the second mark 9B of the present embodiment includes recesses 11 that are recessed from a side profile surface 8a of the tire side portion 8. Such a mark 9 does not protrude from the side profile surface 8a and can reduce the air resistance during tire rotation.

A depth t1 of each recess 11 of the first mark 9A of the present embodiment from the side profile surface 8a is smaller than a depth t2 of each recess 11 of the second mark 9B from the side profile surface 8a. Such a first mark 9A having a small depth t1 can generate appropriate turbulent flow at a position on the outer side in the tire radial direction where the flow velocity of air is relatively high, to inhibit separation of a boundary layer, and can reduce the air resistance during tire rotation.

The second mark 9B having a large depth t2 has good visibility. Furthermore, since the second mark 9B has good visibility, the size of the mark 9 can be reduced, and thus the second mark 9B also serves to reduce the air resistance. Therefore, the tire 1 according to the present embodiment can reduce the air resistance during tire rotation while maintaining good visibility of the mark 9.

Figure 3:
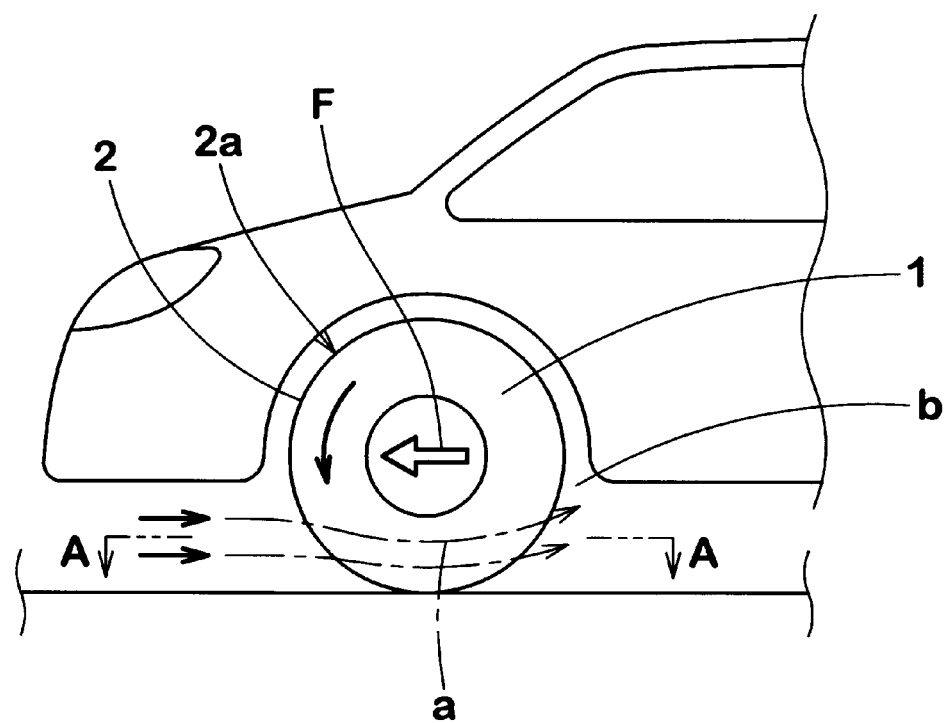
FIG. 3 is a schematic diagram of the flow of air around the tire during running.
Figure 4:
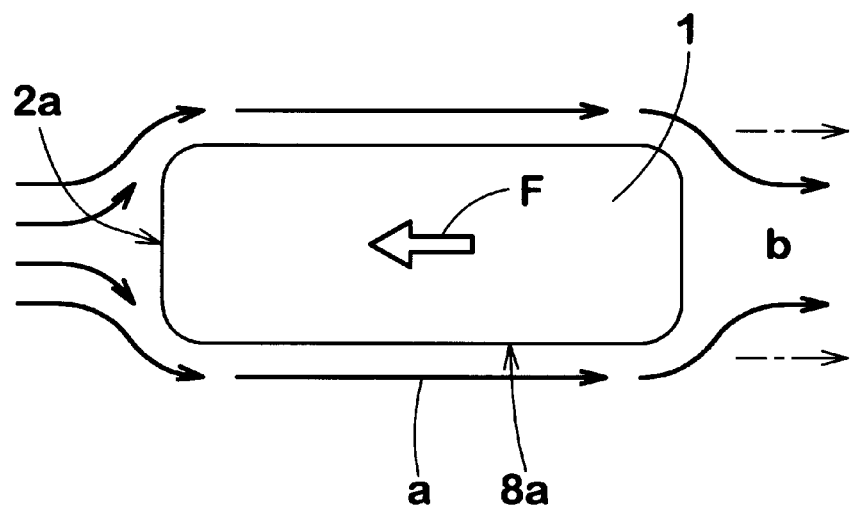
FIG. 4 is a cross-sectional view taken along a line A-A in FIG. 3.

FIG. 3 is a schematic diagram of the flow of air around the tire 1 during running, and FIG. 4 is a cross-sectional view taken along a line A-A in FIG. 3. As shown in FIG. 3 and FIG. 4, air hits a tread surface 2a of the tread portion 2 of the tire 1 from the front side in a traveling direction F during running. This air branches to both sides of the tire axial direction to form airflow a along the side profile surface 8a of the tire side portion 8 toward the rear side.

Since the recesses 11 (shown in FIG. 1) are formed on the tire side portion 8 of the present embodiment, separation of a boundary layer can be inhibited by the airflow a being entrained into the recesses 11 to generate turbulent flow. Thus, in the present embodiment, the airflow a along the side profile surface 8a can flow around to the tread surface 2a side to increase the pressure at a tire rear portion b, resulting in reduction in pressure resistance, and thus serves to reduce the air resistance of the tire 1 during running.

Here, at the tire side portion 8, the relative speed on the outer side in the tire radial direction is high, and thus a boundary layer tends to be easily separated. At the tire side portion 8 of the present embodiment, separation of a boundary layer on the outer side in the tire radial direction is inhibited by changing the depths of the recesses 11 in the tire radial direction. Thus, the separation position of the airflow a can be moved to the rear side in the travelling direction F during running. Therefore, the tire 1 according to the present embodiment has a large effect of causing the airflow a to flow around to the tread surface 2a side, increases the pressure at the tire rear portion b, and can further reduce the air resistance of the tire 1 during running.

As shown in FIG. 1, the depth t1 of the first mark 9A is preferably 58% to 98% of the depth t2 of the second mark 9B. If the depth t1 of the first mark 9A is smaller than 58% of the depth t2 of the second mark 9B, the effect of inhibiting separation of a boundary layer may be limited. If the depth t1 of the first mark 9A is larger than 98% of the depth t2 of the second mark 9B, more air may enter the recess 11 of the first mark 9A, resulting in increase in air resistance.

As shown in FIG. 1 and FIG. 2, the first mark 9A is preferably located in a first region 8A outward of a tire maximum width position 12 in the tire radial direction. Here, the tire maximum width position 12 is a portion where a width W in the tire axial direction is the largest. Such a first mark 9A can generate appropriate turbulent flow in the first region 8A where the flow velocity of air is high, to inhibit separation of a boundary layer.

A serration 13 is preferably provided in the first region 8A where the first mark 9A is located. The groove depth of the serration 13 is preferably smaller than the depth t1 of the first mark 9A. Such a serration 13 generates appropriate turbulent flow in the first region 8A where the flow velocity of air is high, and serves to inhibit separation of a boundary layer.

The serration 13 of the present embodiment extends in a straight manner in the tire radial direction. For example, the serration 13 may extend so as to be tilted relative to the tire radial direction, or may extend in a curved manner. Furthermore, the serration 13 may extend in an arc in the tire circumferential direction. Such a serration 13 serves not only to inhibit separation of a boundary layer but also to improve the appearance.

The second mark 9B is preferably located in a second region 8B inward of the tire maximum width position 12 in the tire radial direction. Since such a second mark 9B has a large depth t2, even when the size of the mark 9 is reduced due to the relatively small surface area of the second region 8B, the second mark 9B has good visibility.

A smooth surface is preferably provided in the second region 8B where the second mark 9B is located. Such a smooth surface serves to improve the visibility of the second mark 9B. For example, a serration having a smaller groove depth than the serration 13 in the first region 8A may be provided in the second region 8B.

The mark 9 of the present embodiment includes a character string 14 in which a plurality of characters 14a is arranged. The respective characters 14a are preferably formed by the recesses 11. Such a character string 14 has a clear contrast with the side profile surface 8a and has good visibility.

As shown in FIG. 2, the character string 14 of the present embodiment includes a first character string 14A provided in the first mark 9A, and a second character string 14B provided in the second mark 9B. A length L1 in the tire radial direction of the first character string 14A is preferably larger than a length L2 in the tire radial direction of the second character string 14B. Such a first character string 14A can effectively generate turbulent flow to inhibit separation of a boundary layer. In addition, since the second character string 14B has good visibility, the length L2 in the tire radial direction can be decreased to reduce the air resistance.

The length L1 of the first character string 14A is preferably 101% to 1000% of the length L2 of the second character string 14B. If the length L1 of the first character string 14A is smaller than the 101% of the length L2 of the second character string 14B, the effect of inhibiting separation of a boundary layer by the first character string 14A may be limited. If the length L1 of the first character string 14A is larger than 1000% of the length L2 of the second character string 14B, the effect of improving the visibility of the second character string 14B may be reduced.

An angle θ1 in the tire circumferential direction of the first character string 14A is preferably larger than an angle θ2 in the tire circumferential direction of the second character string 14B. Such a first character string 14A can effectively generate turbulent flow to inhibit separation of a boundary layer.

The angle θ1 of the first character string 14A is preferably 101% to 500% of the angle θ2 of the second character string 14B. If the angle θ1 of the first character string 14A is smaller than 101% of the angle θ2 of the second character string 14B, the effect of inhibiting separation of a boundary layer by the first character string 14A may be limited. If the angle θ1 of the first character string 14A is larger than 500% of the angle θ2 of the second character string 14B, the effect of improving the visibility of the second character string 14B may be reduced.

A center c1 in the tire circumferential direction of the first character string 14A is preferably provided at a position different in the tire circumferential direction from that of a center c2 in the tire circumferential direction of the second character string 14B. The mark 9 including such a character string 14 disperses positions where turbulent flow is generated, and can efficiently reduce the air resistance.

Figure 5:
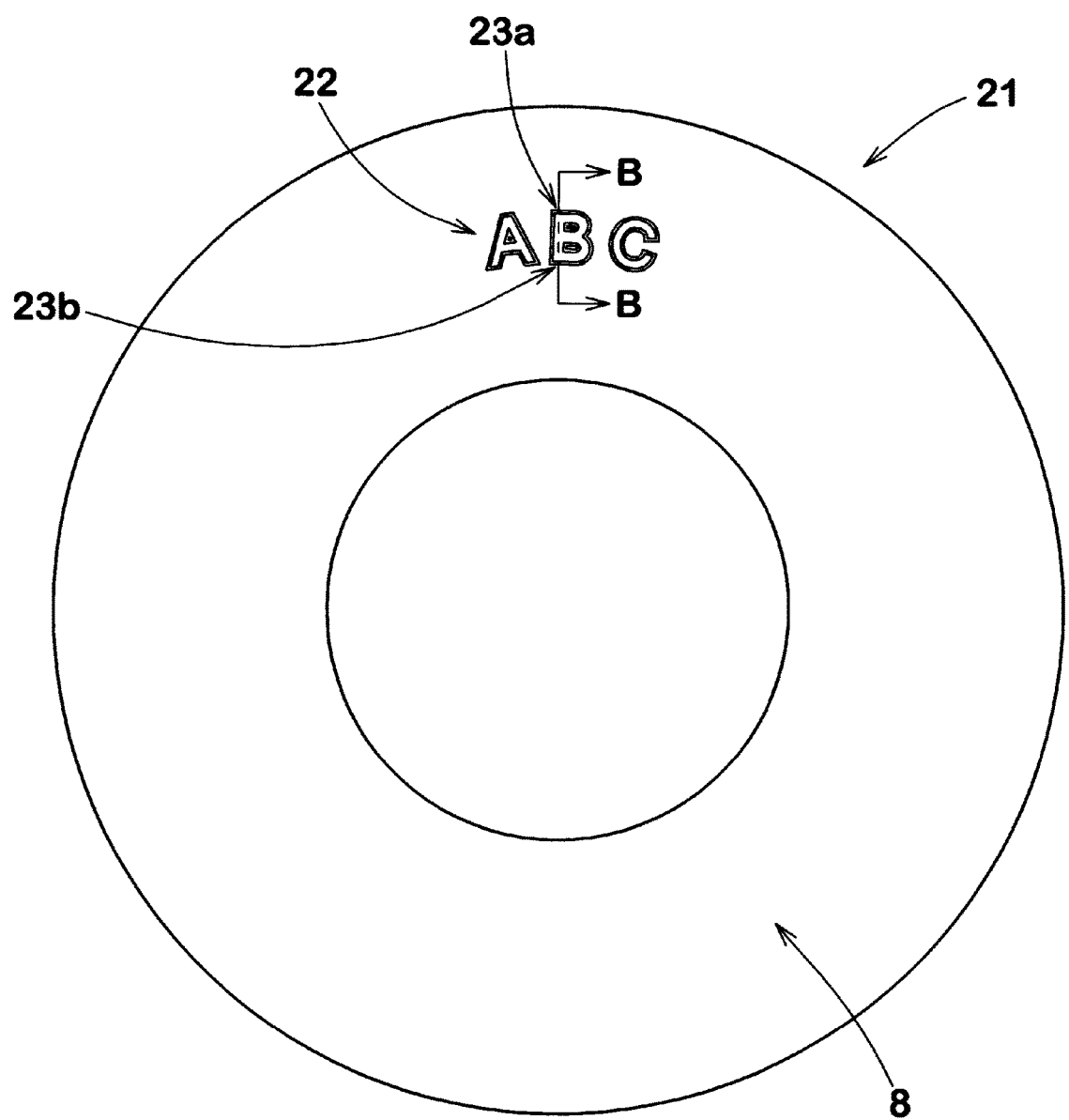
FIG. 5 is a side view of a tire according to another embodiment.

FIG. 5 is a side view of a tire 21 according to another embodiment. The same components as those in the above-described embodiment are designated by the same reference characters, and the description thereof is omitted. As shown in FIG. 5, similar to the above-described tire 1, the tire 21 according to this embodiment is provided with a mark 22 on the tire side portion 8.

Figure 6:
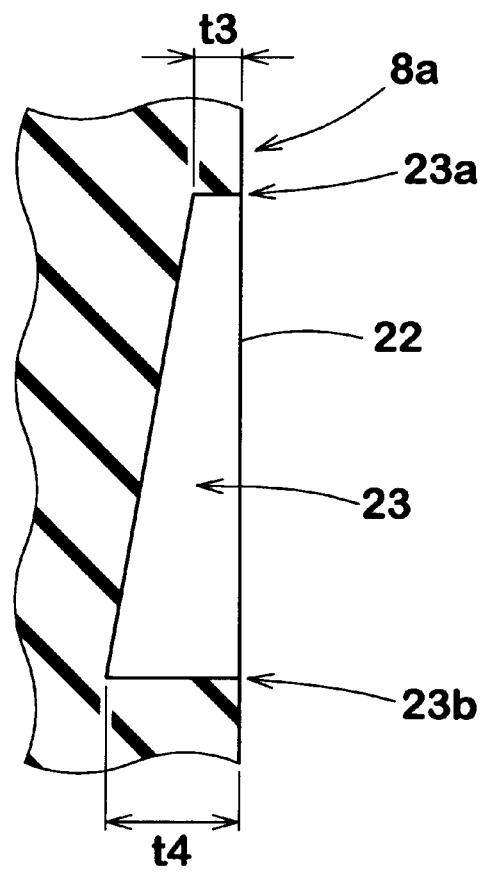
FIG. 6 is a cross-sectional view taken along a line B-B in FIG. 5.

FIG. 6 is a cross-sectional view taken along a line B-B in FIG. 5. As shown in FIG. 5 and FIG. 6, similar to the above-described mark 9, the mark 22 of this embodiment includes recesses 23 that are recessed from the side profile surface 8a of the tire side portion 8. Such a mark 22 does not protrude from the side profile surface 8a and can reduce the air resistance during tire rotation.

In each recess 23 of this embodiment, a depth t3 at a first end 23a on the outer side in the tire radial direction from the side profile surface 8a is smaller than a depth t4 at a second end 23b on the inner side in the tire radial direction from the side profile surface 8a. For example, the depth of the recess 23 gradually increases from the first end 23a to the second end 23b.

Such a recess 23 can generate appropriate turbulent flow on the outer side in the tire radial direction where the flow velocity of air is relatively high, to inhibit separation of a boundary layer, and can reduce the air resistance during tire rotation. In addition, the recess 23 can make a difference in contrast in the tire radial direction, and can improve the visibility of the mark 22. Thus, the tire 21 according to this embodiment can reduce the air resistance during rotation while maintaining good visibility of the mark 22.

Figure 7:
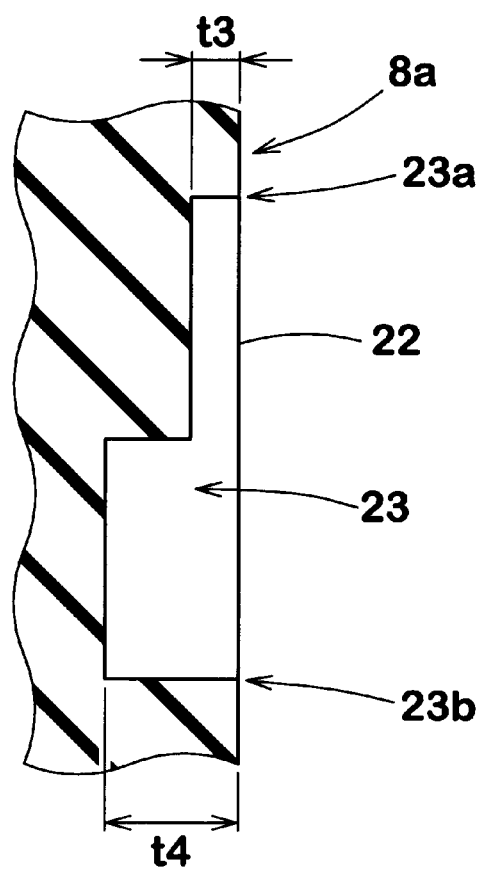
FIG. 7 is a cross-sectional view showing a modification of a recess.

FIG. 7 is a cross-sectional view showing a modification of the recess 23. As shown in FIG. 7, for example, the depth of the recess 23 may change stepwise from the first end 23a to the second end 23b. The recess 23 of this embodiment is illustrated in a cross-section including the depth t3 at the first end 23a side and the depth t4 at the second end 23b, but may be further divided.

Even such a recess 23 can generate appropriate turbulent flow on the outer side in the tire radial direction where the flow velocity of air is relatively high, to inhibit separation of a boundary layer, and can reduce the air resistance during tire rotation. In addition, even the recess 23 can make a difference in contrast in the tire radial direction, and can improve the visibility of the mark 22.

The forms of the recesses 23 of the marks 22 in FIG. 5 to FIG. 7 can also be applied to the mark 9 of the tire 1 shown in FIG. 1 and FIG. 2. In this case, the average depth of the first mark 9A of the tire 1 is preferably smaller than the average depth of the second mark 9B. Due to the above-described synergistic effect, such a tire 1 can reduce the air resistance during tire rotation while maintaining good visibility of the mark 9.

Although the particularly preferred embodiments of the present invention have been described in detail above, the present invention is not limited to the above-described embodiments, and various modifications can be made to implement the present invention.

What is claimed is:

1. A tire provided with a mark on a tire side portion, wherein
    the mark includes a first mark located on an outer side in a tire radial direction, and a second mark located inward of the first mark in the tire radial direction,
    each of the first mark and the second mark includes a recess so that an entirety of the first and second marks is recessed below a side profile surface of the tire side portion,
    an average depth of the recess below the tire side portion of the first mark is smaller than an average depth of the recess below the tire side portion of the second mark,
    the mark includes a character string in which a plurality of characters is arranged,
    the characters are formed by the recesses,
    the character string includes a first character string provided in the first mark and a second character string provided in the second mark,
    an angle in a tire circumferential direction of the first character string is larger than an angle in the tire circumferential direction of the second character string,
    a serration is provided in a first region where the first mark is located, and
    a smooth surface is provided in a second region where the second mark is located.

2. The tire according to claim 1, wherein a length in the tire radial direction of the first character string is larger than a length in the tire radial direction of the second character string.

3. The tire according to claim 1, wherein a center in a tire circumferential direction of the first character string is provided at a position different in the tire circumferential direction from that of a center in the tire circumferential direction of the second character string.

4. The tire according to claim 1, wherein
    the first mark is located outward of a tire maximum width position in the tire radial direction, and
    the second mark is located inward of the tire maximum width position in the tire radial direction.

5. The tire according to claim 1, wherein
    the depth of the recess of the first mark from the side profile surface is 58% to 98% the depth of the recess of the second mark from the side profile surface.

6. The tire according to claim 1, wherein
    a serration is provided in a first region where the first mark is located, wherein a groove depth of the serration is smaller than the depth of the recess of the first mark from the side profile surface.

7. The tire according to claim 1, wherein a center of the angle of the first character string is at a position different in the tire circumferential direction from a center of the angle of the second character string, such that portions of the first and second character strings overlap in a first radial direction and portions of the first and second character strings do not overlap in a second radial direction.

8. A tire provided with a mark on a tire side portion, wherein
    the mark includes a recess so that an entirety of the mark is recessed below a side profile surface of the tire side portion, and
    a depth of the recess increases one of continuously or discontinuously from an outermost edge of the mark in a tire radial direction to an innermost edge of the mark in the tire radial direction.

9. The tire according to claim 8, wherein
    the depth of the recess gradually increases from the outermost edge of the mark to the innermost edge of the mark.

10. The tire according to claim 8, wherein
    the depth of the recess increases stepwise from the outermost edge of the mark to the innermost edge of the mark.

11. A tire provided with a mark on a tire side portion, wherein
    the mark includes a first mark located on an outer side in a tire radial direction, and a second mark located inward of the first mark in the tire radial direction,
    each of the first mark and the second mark includes a recess so that an entirety of the first and second marks is recessed below a side profile surface of the tire side portion,
    an average depth of the recess below the tire side portion of the first mark is smaller than an average depth of the recess below the tire side portion of the second mark,
    the mark includes a character string in which a plurality of characters is arranged,
    the characters are formed by the recesses,
    the character string includes a first character string provided in the first mark and a second character string provided in the second mark,
    an angle in a tire circumferential direction of the first character string is larger than an angle in the tire circumferential direction of the second character string,
    a serration is provided in a first region where the first mark is located, and
    a serration is provided in a second region where the second mark is located, wherein a groove depth of the serration in the first region is greater than a groove depth of the serration in the second region.

12. The tire according to claim 11, wherein
    the first mark is located outward of a tire maximum width position in the tire radial direction, and
    the second mark is located inward of the tire maximum width position in the tire radial direction.

13. The tire according to claim 11, wherein
    the first mark is located outward of a tire maximum width position in the tire radial direction, and
    the second mark is located inward of the tire maximum width position in the tire radial direction.

14. The tire according to claim 11, wherein a center of the angle of the first character string is at a position different in the tire circumferential direction from a center of the angle of the second character string, such that portions of the first and second character strings overlap in a first radial direction and portions of the first and second character strings do not overlap in a second radial direction.

* * * * *